United States Patent
Gomi et al.

(10) Patent No.: US 8,520,134 B2
(45) Date of Patent: Aug. 27, 2013

(54) IMAGE PROCESSING APPARATUS AND METHOD, AND PROGRAM THEREFOR

(75) Inventors: Shinichiro Gomi, Chiba (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 478 days.

(21) Appl. No.: 12/560,827

(22) Filed: Sep. 16, 2009

(65) Prior Publication Data

US 2010/0073521 A1    Mar. 25, 2010

(30) Foreign Application Priority Data

Sep. 19, 2008    (JP) ................. P2008-240334

(51) Int. Cl.
*G03B 13/00* (2006.01)
*H04N 5/232* (2006.01)

(52) U.S. Cl.
USPC ........................................................ 348/354

(58) Field of Classification Search
USPC ........................................................ 348/354
See application file for complete search history.

(56) References Cited

U.S. PATENT DOCUMENTS

| | | | | |
|---|---|---|---|---|
| 2005/0157204 A1* | 7/2005 | Marks | ........................... | 348/370 |
| 2005/0253955 A1* | 11/2005 | Sato | ............................. | 348/345 |
| 2007/0126921 A1* | 6/2007 | Gallagher et al. | ............. | 348/362 |
| 2008/0175576 A1* | 7/2008 | Hong et al. | ..................... | 396/89 |
| 2009/0179998 A1* | 7/2009 | Steinberg et al. | .......... | 348/222.1 |

FOREIGN PATENT DOCUMENTS

| | | | |
|---|---|---|---|
| JP | 11-025263 | | 1/1999 |
| JP | 2002-197486 | | 7/2002 |
| JP | 2002-374529 | | 12/2002 |
| JP | 2002374529 A | * | 12/2002 |
| JP | 2006-013722 | | 1/2006 |

\* cited by examiner

*Primary Examiner* — Anthony J Daniels
(74) *Attorney, Agent, or Firm* — Finnegan, Henderson, Farabow, Garrett & Dunner, L.L.P.

(57) ABSTRACT

An image processing apparatus includes a depth value detecting unit configured to detect depth values of individual pixels of an input image; an integrating unit configured to integrate the depth values in each predetermined region of the input image; an analyzing unit configured to analyze the tendency of an integrated result of the depth values in each predetermined region of the input image; and a processing unit configured to process the input image on the basis of an analysis result obtained by the analyzing unit.

16 Claims, 17 Drawing Sheets

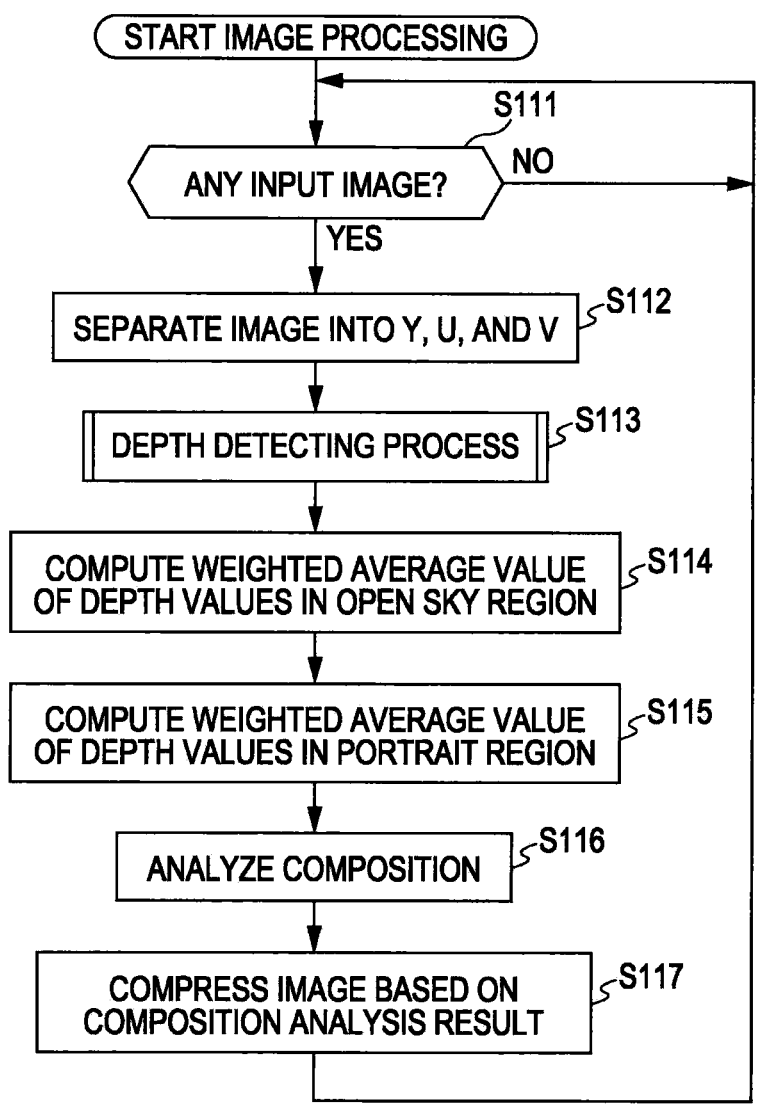

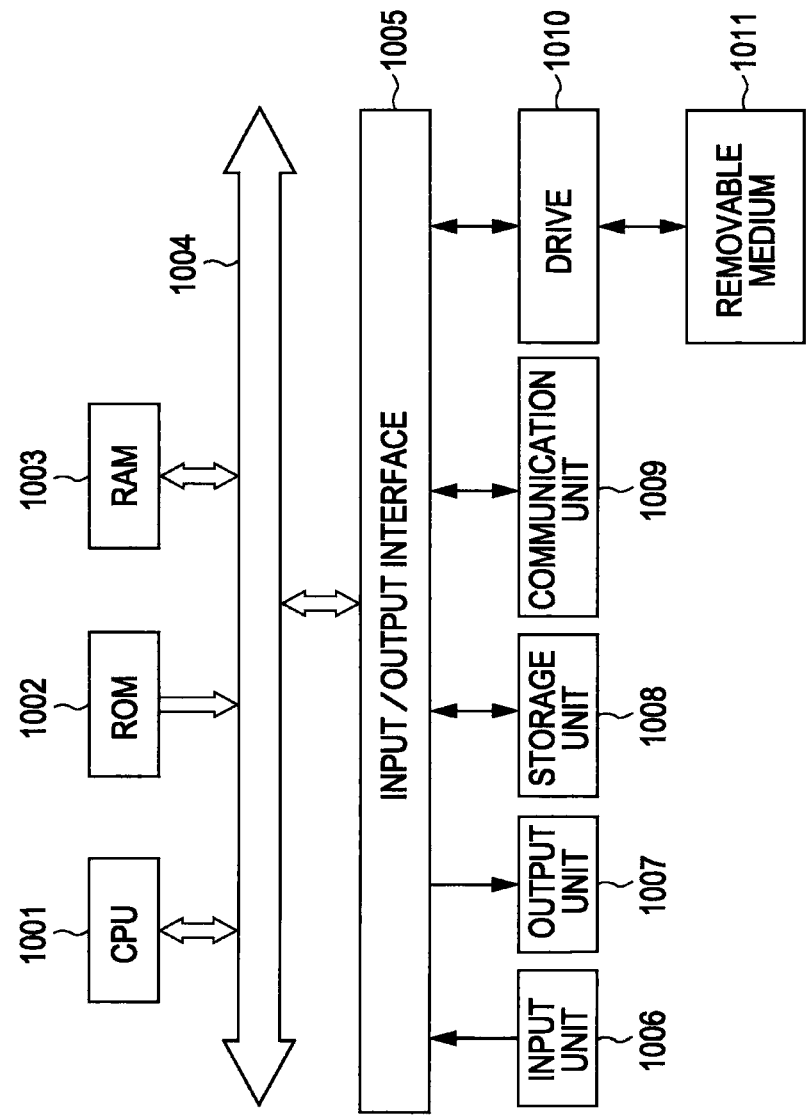

IMAGE PROCESSING APPARATUS AND METHOD, AND PROGRAM THEREFOR

BACKGROUND OF THE INVENTION

1. Field of the Invention

The present invention relates to an information processing apparatus and method, and a program, and more particularly, to an information processing apparatus and method, and a program for making it possible to accurately obtain a depth value of a photographic subject in an image and to process the image on the basis of the obtained depth value.

2. Description of the Related Art

Techniques for setting a depth value for each photographic subject in an image and processing the image in accordance with the depth value have been proposed (Japanese Unexamined Patent Application Publication No. 2002-197486). Also, a process of extracting from an image a depth value of a photographic subject, and applying the above-described image processing in accordance with the extracted depth value has been proposed.

SUMMARY OF THE INVENTION

When a depth value is to be detected from a contour component or a high-frequency component of an image, because such components often depend only on luminance information, the depth value may not be accurately obtained in a flat portion since the contour and high-frequency components are very small in the flat portion. Therefore, it may not be possible to properly perform image processing. Also in a dark region, the contour and high-frequency components are small. Therefore, it may not be possible to obtain an accurate depth value, and hence, it may not be possible to properly perform image processing.

The present invention provides techniques for making it possible to accurately set a depth value even in a flat portion such as a dark portion in an image, and to properly process the image in accordance with the depth value.

An image processing apparatus according to an embodiment of the present invention includes the following elements: depth value detecting means for detecting depth values of individual pixels of an input image; integrating means for integrating the depth values in each predetermined region of the input image; analyzing means for analyzing the tendency of an integrated result of the depth values in each predetermined region of the input image; and processing means for processing the input image on the basis of an analysis result obtained by the analyzing means.

The depth value detecting means may include the following elements: focal information extracting means for extracting, for each of the pixels of the input image, as focal information, a high-frequency component from luminance signals of peripheral pixels; region uniting means for generating united focal information by uniting, on a pixel-by-pixel basis, items of focal information of peripheral pixels; dark portion processing means for generating dark portion focal information of the input image by replacing, on a pixel-by-pixel basis, focal information of a pixel with a value obtained on the basis of, among the items of focal information of the peripheral pixels, focal information that is greater than the focal information of the pixel; lighting component extracting means for extracting a lighting component by uniting a luminance signal of each of the pixels with the luminance signals of the peripheral pixels; brightness/darkness uniting means for computing a depth value of each of the pixels by performing a product-sum operation on the united focal information and the dark portion focal information, the product-sum operation including a coefficient using the lighting component; normalizing means for normalizing the depth value of each of the pixels; tone curve controlling means for controlling, using a tone curve, the depth value normalized by the normalizing means; saturation detecting means for detecting saturation of each of the pixels; and saturation controlling means for controlling, using the saturation, the depth value controlled using the tone curve by the tone curve controlling means.

The processing means may enhance the image quality of the input image on the basis of the analysis result.

The processing means may compress the input image on the basis of the analysis result.

An image processing method according to an embodiment of the present invention includes the steps of: detecting depth values of individual pixels of an input image; integrating the depth values in each predetermined region of the input image; analyzing the tendency of an integrated result of the depth values in each predetermined region of the input image; and processing the input image on the basis of an analysis result.

A program according to an embodiment of the present invention causes a computer to perform processing including the steps of: detecting depth values of individual pixels of an input image; integrating the depth values in each predetermined region of the input image; analyzing the tendency of an integrated result of the depth values in each predetermined region of the input image; and processing the input image on the basis of an analysis result.

According to an embodiment of the present invention, depth values of individual pixels of an input image are detected; the depth values in each predetermined region of the input image are integrated; the tendency of an integrated result of the depth values in each predetermined region of the input image is analyzed; and the input image is processed on the basis of an analysis result.

The image processing apparatus according to an embodiment of the present invention may be an independent apparatus or a block that performs image processing.

According to an embodiment of the present invention, it is made possible to accurately obtain a depth value of a photographic subject in an image and to properly process the image in accordance with the depth value.

BRIEF DESCRIPTION OF THE DRAWINGS

FIG. 19 is a flowchart describing image processing performed by the image processing apparatus illustrated in FIG. 18; and FIG. 20 is a block diagram illustrating a structure example of a personal computer.

DESCRIPTION OF THE PREFERRED EMBODIMENTS

The best mode of the present invention (hereinafter referred to as embodiments) will now be described. The description will be given in the following order:

1: First Embodiment (Image Quality Enhancement Processing)

2: Second Embodiment (Compression Processing)

1. First Embodiment

Structure Example of Image Processing Apparatus

Figure 1:
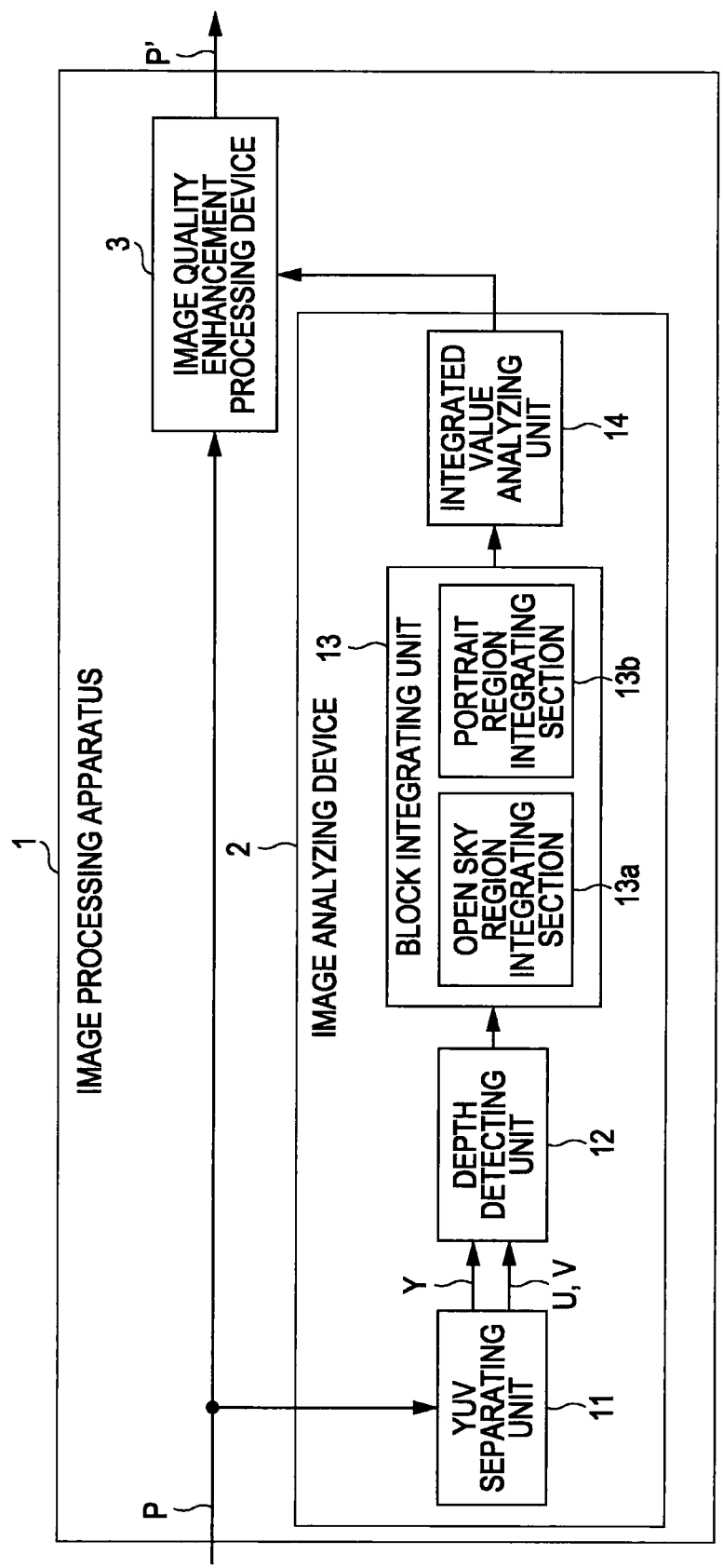
FIG. 1 is a block diagram illustrating a structure example of an image processing apparatus according to an embodiment of the present invention.

FIG. 1 illustrates a structure example of an image processing apparatus according to an embodiment of the present invention.

An image processing apparatus 1 illustrated in FIG. 1 includes an image analyzing device 2 and an image quality enhancement processing device 3. The image processing apparatus 1 analyzes the composition of an input image and performs image quality enhancement processing in accordance with the analyzed composition.

The image analyzing device 2 includes a YUV separating unit 11, a depth detecting unit 12, a block integrating unit 13, and an integrated value analyzing unit 14. The image analyzing device 2 obtains, from an input image, the expansion in the image, that is, depth values of individual pixels of the input image, analyzes the composition of the input image in accordance with the obtained depth values, and supplies the analysis result to the image quality enhancement processing device 3.

The YUV separating unit 11 separates an input image constituted by, for example, RGB signals into, for example, YUV signals (luminance signal Y and chrominance signals U and V) by converting the RGB signals into YUV signals on a pixel-by-pixel basis, and supplies the YUV signals to the depth detecting unit 12. The depth detecting unit 12 obtains a depth value d of each pixel from the luminance signal Y and the chrominance signals U and V, and supplies the depth values d of the individual pixels to the block integrating unit 13. A detailed structure example of the depth detecting unit 12 will be described later with reference to FIG. 2.

The block integrating unit 13 integrates the depth values d in each region in the input image on the basis of the depth values d of the individual pixels, and supplies the integrated result in each region to the integrated value analyzing unit 14. More specifically, the block integrating unit 13 includes an open sky region integrating section 13a and a portrait region integrating section 13b. Of these sections, the open sky region integrating section 13a integrates the depth values d in an open sky region including an upper region of the input image, and obtains an open sky region weighted average value sdo. The portrait region integrating section 13b integrates the depth values d in a portrait region including left and right lateral regions of the input image, and obtains a portrait region weighted average value sdp. The block integrating unit 13 supplies the open sky region weighted average value sdo and the portrait region weighted average value sdp to the integrated value analyzing unit 14.

The integrated value analyzing unit 14 analyzes the degree of open sky and the degree of portrait on the basis of the open sky region weighted average value sdo and the portrait region weighted average value sdp, specifies the composition on the basis of the degree of open sky and the degree of portrait, which are the analysis results, and supplies information on the specified composition to the image quality enhancement processing device 3. The correspondence of the degree of open sky and the degree of portrait with the composition will be described in detail later.

The image quality enhancement processing device 3 enhances the image quality of the input image on the basis of the composition of the input image, which is specified on the basis of the degree of open sky and the degree of portrait, and outputs the image-quality-enhanced input image.

Structure Example of Depth Detecting Unit

Figure 2:
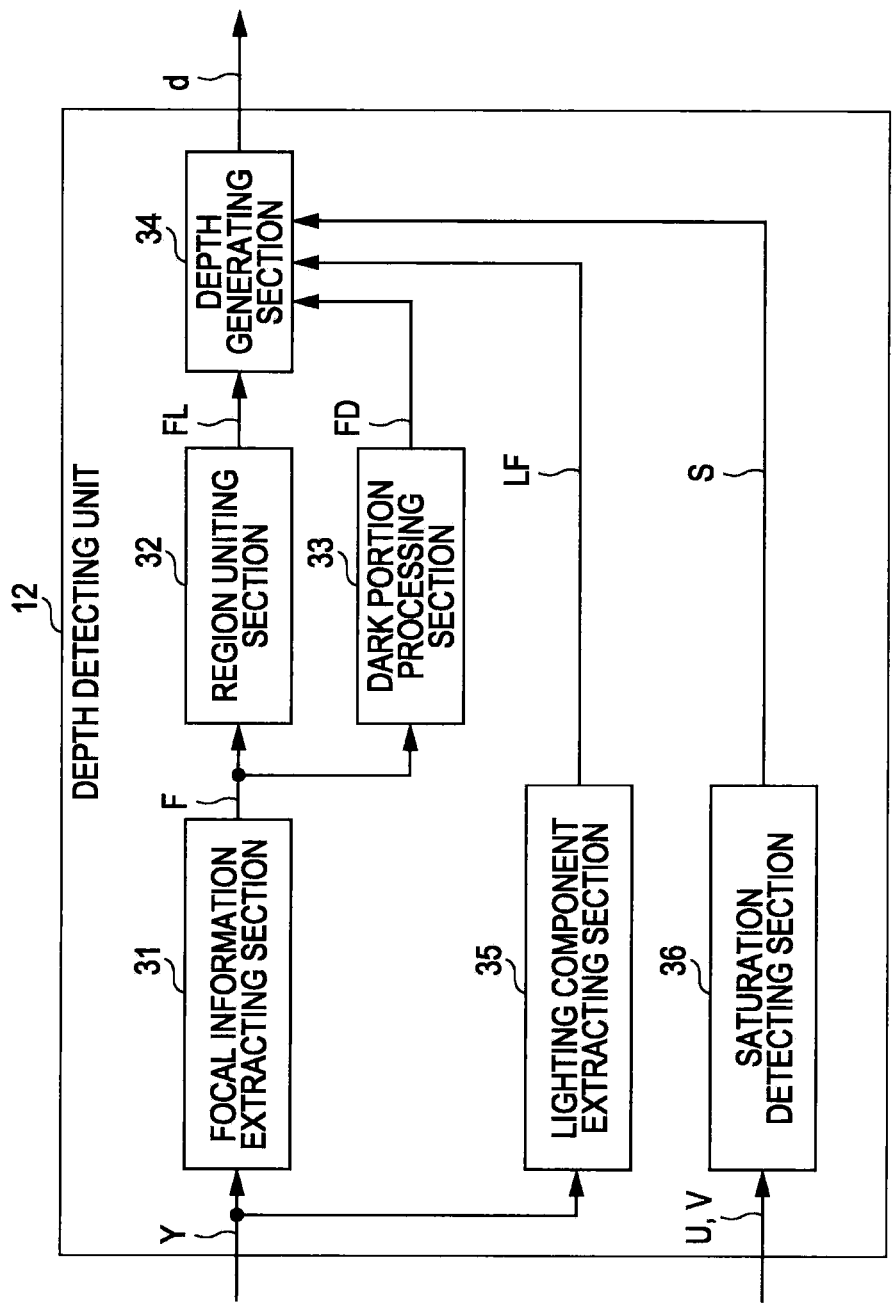
FIG. 2 is a block diagram illustrating a structure example of a depth detecting unit illustrated in FIG. 1.

With reference to FIG. 2, a detailed structure example of the depth detecting unit 12 will now be described.

The depth detecting unit 12 includes a focal information extracting section 31, a region uniting section 32, a dark portion processing section 33, a depth generating section 34, a lighting component extracting section 35, and a saturation detecting section 36. The depth detecting unit 12 obtains a depth value d of each pixel from a luminance signal Y and chrominance signals U and V, and supplies the depth value d to the block integrating unit 13.

The focal information extracting section 31 extracts a high-frequency component by multiplying the luminance signal Y by a horizontal high pass filter (HPF) and a vertical HPF, and supplies the extracted high-frequency component as focal information F to the region uniting section 32 and the dark portion processing section 33. A structure example of the focal information extracting section 31 will be described in detail later with reference to FIG. 3.

The region uniting section 32 includes a low pass filter (LPF). The region uniting section 32 unites focal information F by smoothing the focal information F so that the focal information F will become closer to the values of items of focal information F of peripheral pixels on a pixel-by-pixel basis, thereby generating focal information FL, and supplies the generated focal information FL to the depth generating section 34. Since the region uniting section 32 may by any section as long as it can perform uniting processing to make focal information F closer to the values of items of focal information F of peripheral pixels, the region uniting section 32 may include, besides an LPF, a finite impulse response (FIR) filter, an infinite impulse response (IIR) filter, a E filter, or a median filter.

The dark portion processing section 33 obtains, on a pixel-by-pixel basis, an average value of values that are greater than focal information F of a target pixel by comparing the focal information F of the target pixel with items of focal information F of peripheral pixels. The dark portion processing section 33 performs processing to make a dark portion brighter by replacing the focal information F of the target pixel with the obtained average value, thereby generating focal information FD, and supplies the generated focal information FD to the depth generating section 34.

The lighting component extracting section 35 includes an LPF. The lighting component extracting section 35 performs processing to make a luminance signal Y closer to luminance signals Y of peripheral pixels by smoothing the luminance signal Y, thereby extracting a lighting component LF, and supplies the extracted lighting component LF to the depth generating section 34.

The saturation detecting section 36 detects saturation S from the chrominance signals U and V, and supplies the detected saturation S to the depth generating section 34.

The depth generating section 34 generates and outputs a depth value d on the basis of the focal information FL and FD, lighting component LF, and saturation S. The depth generating section 34 will be described in detail later with reference to FIG. 5.

Structure Example of Focal Information Extracting Section

Figure 3:
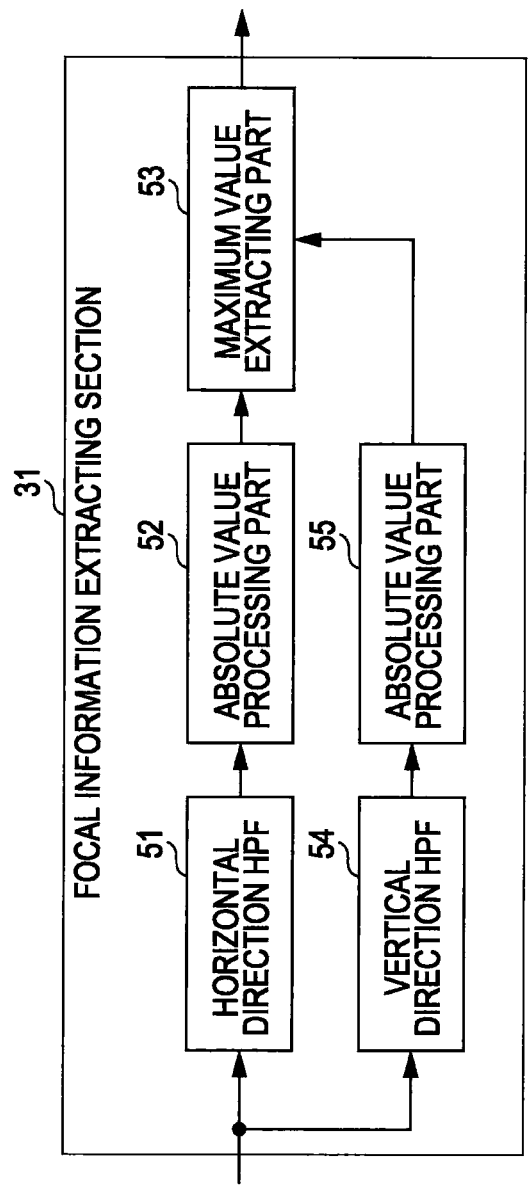
FIG. 3 is a block diagram illustrating a structure example of a focal information extracting section illustrated in FIG. 2.

Referring now to FIG. 3, a detailed structure example of the focal information extracting section 31 will be described.

The focal information extracting section 31 includes a horizontal direction HPF 51, an absolute value processing part 52, a maximum value extracting part 53, a vertical direction HPF 54, and an absolute value processing part 55. The focal information extracting section 31 extracts a high-frequency component of a luminance signal Y and outputs the extracted high-frequency component as focal information F.

Figure 4:
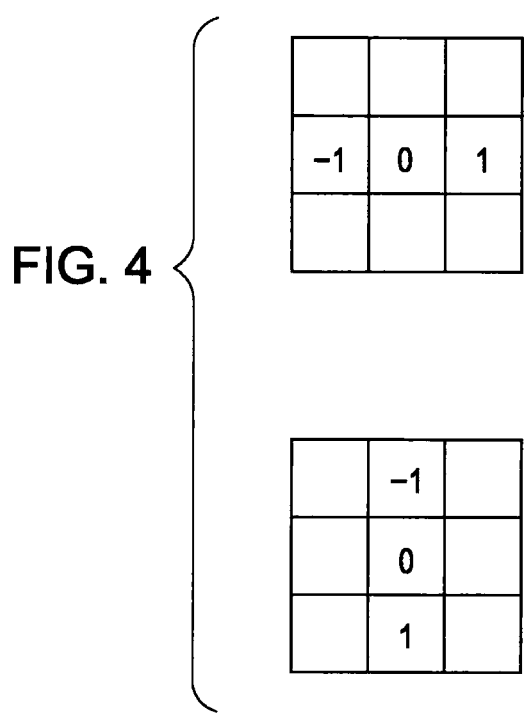
FIG. 4 is a block diagram illustrating a structure example of a horizontal direction high pass filter (HPF) and a vertical direction HPF.

The horizontal direction HPF 51 is, for example, an HPF that extracts a horizontal-direction high-frequency component, such as that illustrated in the left portion of FIG. 4. The horizontal direction HPF 51 extracts a horizontal-direction high-frequency component YH of an input luminance signal Y, and outputs the extracted horizontal-direction high-frequency component YH to the absolute value processing part 52.

The absolute value processing part 52 obtains the absolute value of the high-frequency component YH extracted as the horizontal-direction high-frequency component, and supplies the obtained absolute value to the maximum value extracting part 53.

The vertical direction HPF 54 is, for example, an HPF that extracts a vertical-direction high-frequency component, such as that illustrated in the right portion of FIG. 4. The vertical direction HPF 54 extracts a vertical-direction high-frequency component YV of an input luminance signal Y, and outputs the extracted vertical-direction high-frequency component YV to the absolute value processing part 55.

The absolute value processing part 55 obtains the absolute value of the high-frequency component YV extracted as the vertical-direction high-frequency component, and supplies the obtained absolute value to the maximum value extracting part 53.

The maximum value extracting part 53 extracts a maximum value of the high-frequency components YH and YV, and outputs the extracted maximum value as focal information F.

Structure Example of Depth Generating Section

Figure 5:
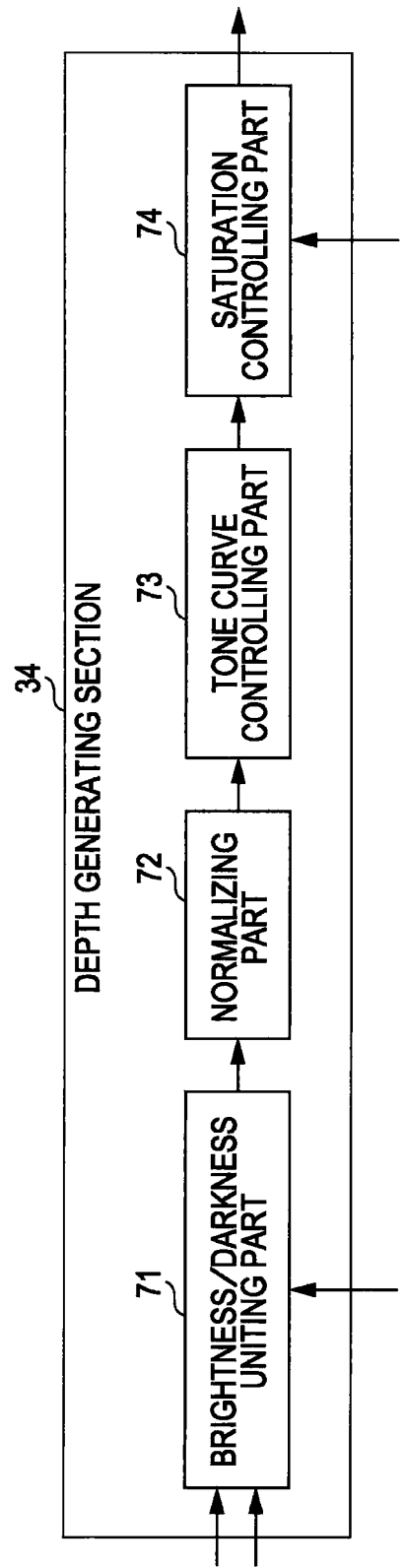
FIG. 5 is a block diagram illustrating a structure example of a depth generating section illustrated in FIG. 2.

Referring now to FIG. 5, a detailed structure example of the depth generating section 34 will be described.

The depth generating section 34 includes a brightness/darkness uniting part 71, a normalizing part 72, a tone curve controlling part 73, and a saturation controlling part 74. The depth generating section 34 generates and outputs a depth value d on the basis of the focal information FL and FD, lighting component LF, and saturation S.

The brightness/darkness uniting part 71 combines the luminance signal YL from the region uniting section 32 and the luminance signal YD from the dark portion processing section 33 at a ratio based on the lighting component LF supplied from the lighting component extracting section 35, thereby uniting the bright portion and the dark portion of the luminance signal, and supplies a combined signal g to the normalizing part 72.

The normalizing part 72 normalizes the combined signal g supplied from the brightness/darkness uniting part 71, and supplies a normalized combined signal g' to the tone curve controlling part 73.

The tone curve controlling part 73 generates a depth value dg by controlling the combined signal g' in accordance with a preset tone curve, and supplies the generated depth value dg to the saturation controlling part 74.

The saturation controlling part 74 generates a depth value d by multiplying the depth value dg supplied from the tone curve controlling part 73 by a coefficient set on the basis of the saturation S supplied from the saturation detecting section 36, and supplies the generated depth value d to the block integrating unit 13.

Image Processing Performed by Image Processing Apparatus in FIG. 1

Referring now to the flowchart illustrated in FIG. 6, image processing performed by the image processing apparatus 1 illustrated in FIG. 1 will be described.

In step S11, the YUV separating unit 11 determines whether a new image has been supplied, and repeats the same processing until a new image is supplied. When a new image is input in step S11, the flow proceeds to step S12.

In step S12, the YUV separating unit 11 converts and separates the input image in units of pixels into YUV signals, and supplies the luminance signal Y and the chrominance signals U and V to the depth detecting unit 12.

In step S13, the depth detecting unit 12 obtains a depth value d of each pixel by performing a depth detecting process on the basis of the luminance signal Y and the chrominance signals U and V, and supplies the depth values d of the individual pixels to the block integrating unit 13.

Depth Detecting Process

Referring now to the flowchart illustrated in FIG. 7, the depth detecting process will be described.

In step S31, the saturation detecting section 36 obtains saturation S from the supplied chrominance signals U and V by calculating the following equation (1), and supplies the obtained saturation S to the depth generating section 34:

$$S=\sqrt{(U^2+V^2)} \quad (1)$$

wherein U and V are chrominance signals. That is, saturation S is obtained as a square root of the sum of squares of the chrominance signals U and V.

In step S32, the lighting component extracting section 35 performs processing so that the luminance signal Y of each pixel will become closer to the luminance signals Y of peripheral pixels by smoothing the luminance signal Y of each pixel on the basis of the luminance signals Y of the peripheral pixels, thereby extracting a lighting component LF, and supplies the lighting component LF to the depth generating section 34. That is, a bright region has a smaller high-frequency component even in an in-focus state. Therefore, a value closer to the luminance signals Y of peripheral pixels is extracted as a lighting component LF.

In step S33, the focal information extracting section 31 obtains focal information F from the luminance signal Y by performing a focal information extracting process for each pixel, and supplies the obtained focal information F to the region uniting section 32 and the dark portion processing section 33.

Focal Information Extracting Process

Figure 8:
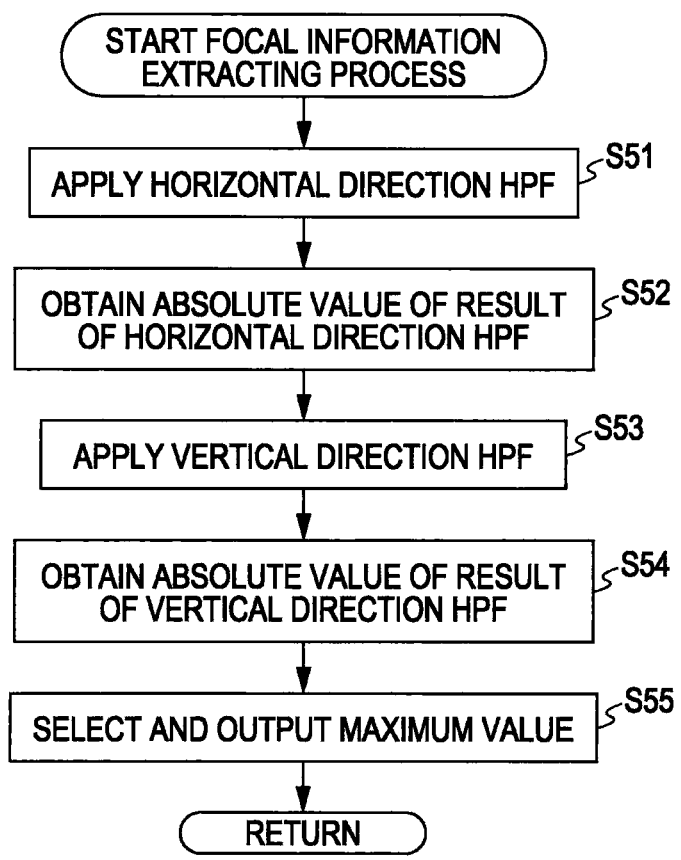
FIG. 8 is a flowchart describing a focal information extracting process.

Referring now to the flowchart illustrated in FIG. 8, the focal information extracting process will be described.

In step S51, the horizontal direction HPF 51 extracts a high-frequency component YH by applying a horizontal-direction filtering process, such as that illustrated in the left portion of FIG. 4, to the input luminance signal Y, and supplies the extracted high-frequency component YH to the absolute value processing part 52.

In step S52, the absolute value processing part 52 obtains the absolute value of the high-frequency component YH extracted as the horizontal-direction high-frequency component, and supplies the absolute value to the maximum value extracting part 53.

In step S53, the vertical direction HPF 54 extracts a high-frequency component YV by applying a vertical-direction filtering process, such as that illustrated in the right portion of FIG. 4, to the input luminance signal Y, and supplies the extracted high-frequency component YV to the absolute value processing part 55.

In step S54, the absolute value processing part 55 obtains the absolute value of the high-frequency component YV extracted as the vertical-direction high-frequency component, and supplies the absolute value to the maximum value extracting part 53.

In step S55, the maximum value extracting part 53 extracts the maximum value of the high-frequency components YH and YV, that is, a larger value of the two components YH and YV, and outputs the maximum value as focal information F to the region uniting section 32 and the dark portion processing section 33.

With the foregoing process, a larger value of the horizontal-direction and vertical-direction high-frequency components of each pixel of an input image P is output as focal information F.

Figure 7:
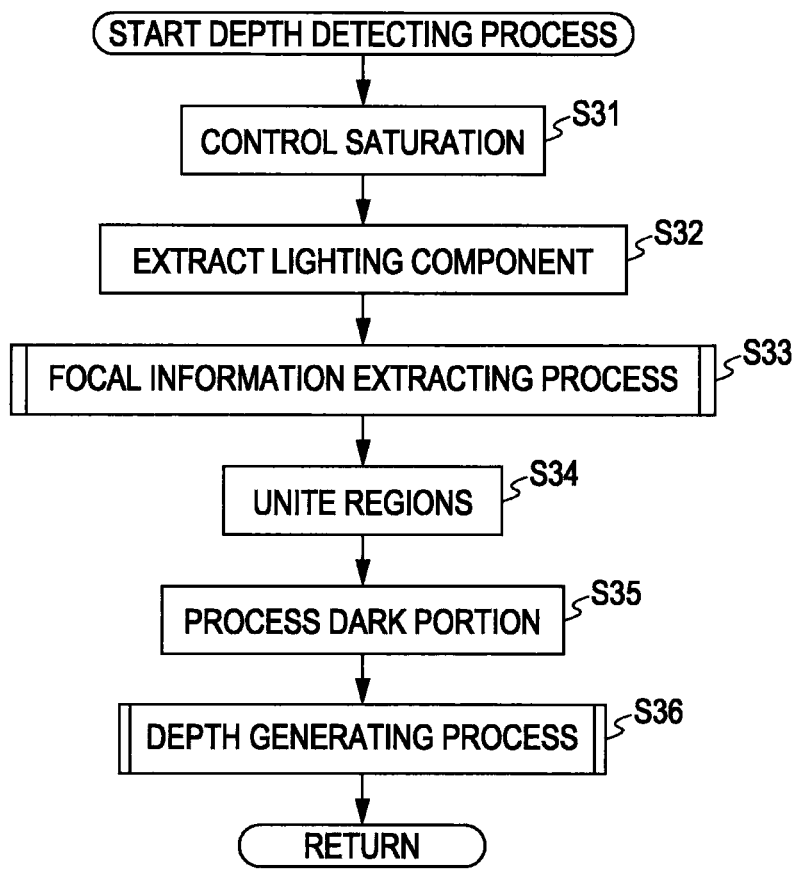
FIG. 7 is a flowchart describing a depth detecting process.

The description refers back to the flowchart illustrated in FIG. 7.

In step S34, the region uniting section 32 generates focal information FL by smoothing the focal information F so that the focal information F will become closer to the values of items of focal information F of peripheral pixels, and supplies the focal information FL to the depth generating section 34. That is, with this process, the region uniting section 32, which regards that the entire image is constituted by high-frequency components, smoothes the focal information F to generate focal information FL, and supplies the generated focal information FL to the depth generating section 34.

Figure 9:
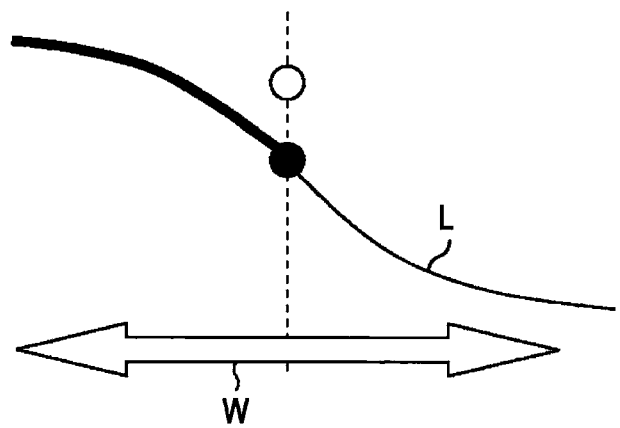
FIG. 9 is an illustration describing an operation of a dark portion processing section.

In step S35, the dark portion processing section 33 compares, on a pixel-by-pixel basis, focal information F of a pixel serving as a processing target, i.e., a target pixel, with items of focal information F of peripheral pixels, and obtains an average value of items of focal information F of peripheral pixels that are greater than the focal information F of the target pixel. That is, the dark portion processing section 33 obtains an average value FA (white circle in FIG. 9) of, among items of focal information F in a range W in one dimension, such as a vertical direction or a horizontal direction, around a pixel serving as a processing target, i.e., a target pixel, which is indicated by a black circle in FIG. 9, values that are greater than focal information F of the target pixel, which is indicated by a bold line. The dark portion processing section 33 generates focal information FD by replacing the focal information F of the target pixel with the obtained average value FA. With this process, on a pixel-by-pixel basis, focal information F of a target pixel is replaced with an average value FA of, among items of focal information F of peripheral pixels, items of focal information F that are greater than the focal information F of the target pixel, thereby generating focal information FD. Thus, processing is performed to make the dark portion brighter. That is, for example, pixels that exist in a dark area in an image are processed so that these pixels will become brighter. In the process performed by the dark portion processing section 33, it is only necessary to use an average value of values within a predetermined range around a pixel serving as a processing target. Alternatively, for example, focal information F of a pixel serving as a processing target may be replaced with an average value of values that are within a two-dimensional range around the pixel serving as the processing target and that are greater than the focal information F of the pixel serving as the processing target.

In step S36, the depth generating section 34 generates a depth value d on the basis of the focal information FL and FD, lighting component LF, and saturation S by performing a depth generating process, and supplies the generated depth value d to the block integrating unit 13.

Depth Generating Process

Figure 10:
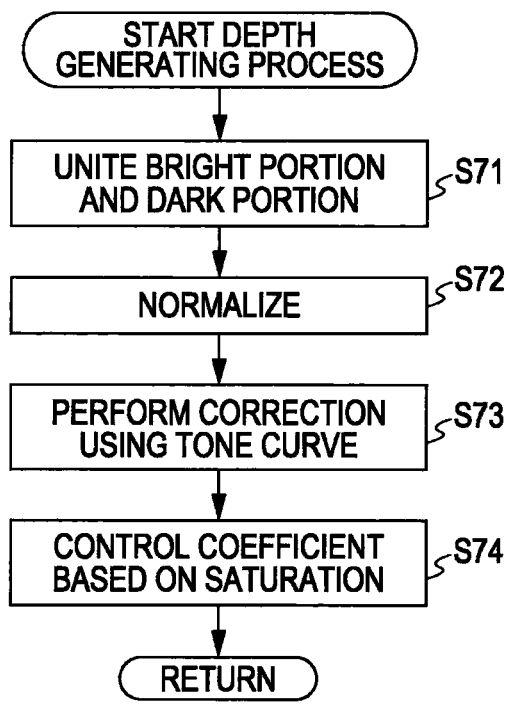
FIG. 10 is a flowchart describing a depth generating process.

Referring now to the flowchart illustrated in FIG. 10, the depth generating process will be described.

Figure 11:
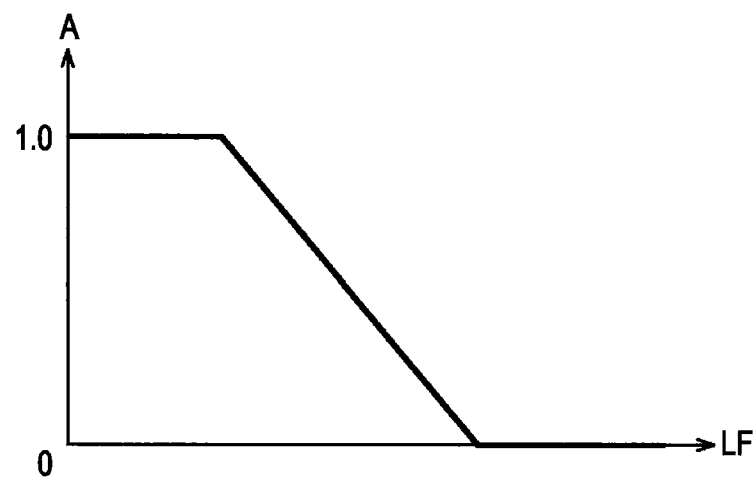
FIG. 11 is a graph describing a depth generating process.

In step S71, the brightness/darkness uniting part 71 combines the luminance signal YL and the luminance signal YD at a ratio based on the lighting component LF by calculating the following equation (2) to generate a combined signal g, and supplies the combined signal g to the normalizing part 72:

$$g = A \times FD + (1-A) \times FL \qquad (2)$$

wherein g indicates a combined signal, FD indicates a luminance signal in a dark portion, YL indicates a luminance signal in a bright portion, and A indicates a coefficient determined on the basis of the lighting component LF, as illustrated in FIG. 11. That is, the coefficient A is a value within the range from 0 to 1.0. When the lighting component LF is close to 0, the coefficient A becomes 1.0. The coefficient A remains as 1.0 until the lighting component LF becomes a predetermined value. When the lighting component LF becomes greater than the predetermined value, the coefficient A linearly becomes smaller as the lighting component LF becomes greater. When the lighting component LF exceeds a predetermined value, the coefficient A becomes 0.

Therefore, in an overall bright image in which the lighting component LF is great, the brightness/darkness uniting part 71 combines the luminance signal YL in a bright portion and the luminance signal YD in a dark portion so that the proportion of the luminance signal YL in the bright portion will become greater. Conversely, in an overall dark image in which the lighting component LF is small, the brightness/darkness uniting part 71 combines the luminance signal YL in a bright portion and the luminance signal YD in a dark portion so that the proportion of the luminance signal YD in the dark portion will become greater.

As a result, when the input image P is an overall bright image, the focal information F is adjusted in accordance with the luminance signal YL with a great high-frequency component. Conversely, when the input image P is an overall dark image, the focal information F is adjusted in accordance with the luminance signal YD that has been subjected to a dark portion process.

In step S72, the normalizing part 72 normalizes the combined signal g by calculating the following equation (3), and supplies a normalized combined signal g' to the tone curve controlling part 73:

$$g'=(g-gmin)/(gmax-gmin) \quad (3)$$

wherein g' indicates a normalized combined signal, g indicates a combined signal before being normalized, gmax indicates the maximum value among combined signals g of the individual pixels of an input image, and gmin indicates the minimum value of the combined signals g of the individual pixels of the input image.

Figure 12:
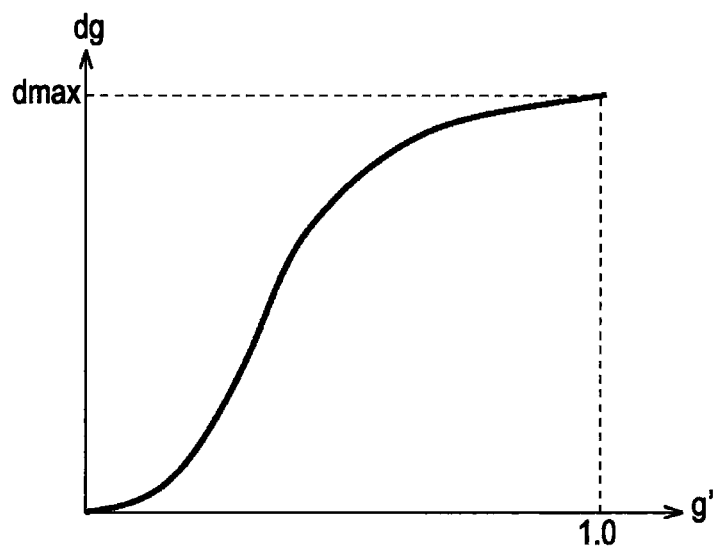
FIG. 12 is a graph describing a tone curve.

In step S73, the tone curve controlling part 73 generates a depth value dg by controlling the combined signal g' in accordance with a tone curve, such as that illustrated in FIG. 12, and supplies the depth value dg to the saturation controlling part 74. That is, as illustrated in FIG. 12, in a preset tone curve, when the combined signal g' is a value close to 0 or close to 1, the depth value dg gradually increases. When the combined signal g' is close to 0.4, the depth value dg suddenly increases. Therefore, when the combined signal g' is great, the depth value dg is set to be small. When the combined signal g' is small, the depth value dg is set to be great. In addition, the depth value dg becomes a value close to 0 or 1.0 depending on the magnitude of the combined signal g'. Therefore, control is performed so that whether a certain object exists toward front or back (i.e., depth) can be distinguished in a relatively clear manner.

Figure 13:
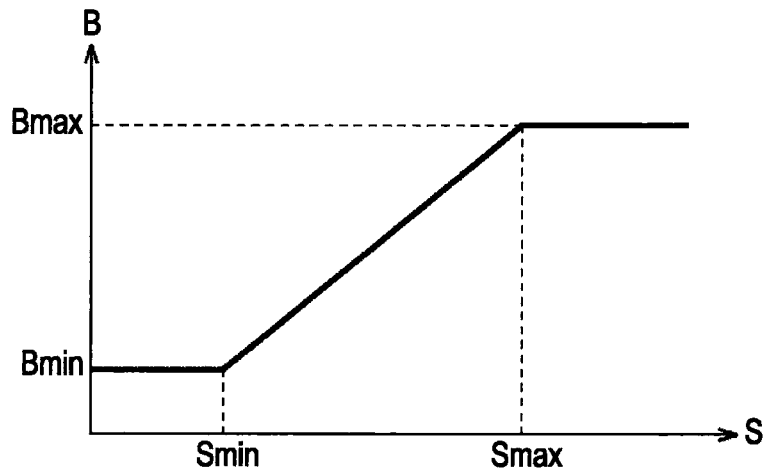
FIG. 13 is a graph describing the relationship between saturation S and a coefficient B.

In step S74, the saturation controlling part 74 multiplies the depth value dg supplied from the tone curve controlling part 73 by a coefficient B set on the basis of saturation S supplied from the saturation detecting section 36, which is indicated in FIG. 13, thereby generating a depth value d that is under control of the saturation S. More specifically, the saturation controlling part 74 computes a depth value d by calculating the following equation (4), and supplies the computed depth value d to the block integrating unit 13:

$$d=B \times dg \quad (4)$$

wherein d indicates a depth value under control of the saturation S, B indicates a coefficient set on the basis of the saturation S, which is illustrated in FIG. 13, and dg indicates a depth value before being subjected to control based on the saturation S.

As illustrated in FIG. 13, the coefficient B is a value that is within the range from the minimum value Bmin to the maximum value Bmax of the preset coefficient B. The coefficient B is a value that is linearly converted with respect to the range from the minimum value Smin to the maximum value Smax of the saturation S of the input image. That is, the depth value d is controlled so that the depth value dg that is a value before being subjected to control becomes greater as the saturation S becomes greater, and, conversely, the depth value d is controlled so that the depth value dg that is a value before being subjected to control becomes smaller as the saturation S becomes smaller. Therefore, the greater the saturation S, the greater the depth value d. In this way, the depth value d can be set to a value based on which the depth can be more clearly identified. The smaller the saturation S, the smaller the depth value d. In this way, the depth value d can be set to a value based on which the depth is more difficult to be identified.

With the foregoing process, the depth value d is set on the basis of the combined signal g set in accordance with brightness/darkness of the individual pixels of an input image, the lighting component LF, and the saturation S. Therefore, the depth value d can be appropriately computed.

Figure 6:
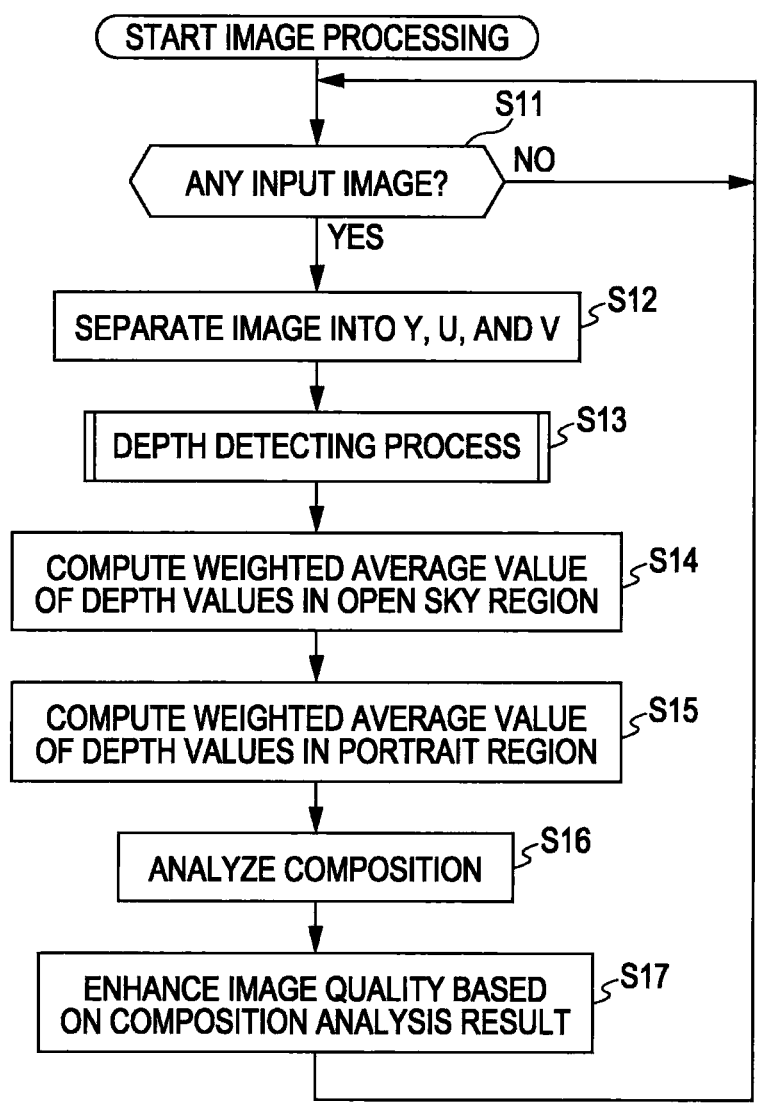
FIG. 6 is a flowchart describing image processing performed by the image processing apparatus illustrated in FIG. 1.

The description refers back to the flowchart illustrated in FIG. 6.

That is, when the depth generating process in step S36 in the flowchart illustrated in FIG. 7 is completed, the depth detecting process in step S13 in the flowchart illustrated in FIG. 6 is completed. The flow proceeds to step S14.

In step S14, the block integrating unit 13 controls the open sky region integrating section 13a to integrate depth values d in an open sky region including an upper region of an input image and to obtain an open sky region weighted average value sdo. That is, an open sky region is, for example, a region Z1 indicated as a slanted-line portion in an input image P illustrated in the left portion of FIG. 14. The open sky region integrating section 13a integrates the depth values d of pixels belonging to the open sky region which is indicated as the region Z1 and, using a weight w(x, y) that is distributed in the vertical direction so as to become the maximum value μy at the center in the vertical direction, such as that illustrated by a curve in the upper left-hand corner of the left portion of FIG. 14, obtains an open sky region weighted average value sdo.

In step S15, the block integrating unit 13 controls the portrait region integrating section 13b to integrate depth values d in a portrait region including left and right lateral regions of an input image and to obtain a portrait region weighted average value sdp. That is, a portrait region includes, for example, regions Z2 indicated as slanted-line portions in an input image P illustrated in the right portion of FIG. 14. The portrait region integrating section 13b integrates the depth values d of pixels belonging to the portrait region which is indicated as the regions Z2 and, using a weight w(x, y) that is distributed in the horizontal direction so as to become the maximum value μy at the center in the horizontal direction, such as that illustrated by curves in the lower left and right corners of the right portion of FIG. 14, obtains a portrait region weighted average value sdp.

Figure 15:
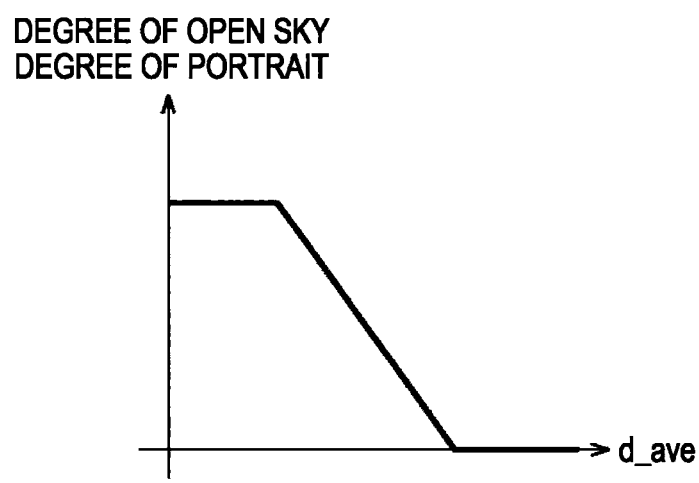
FIG. 15 is a graph describing the relationship between the degree of open sky and the open sky region weighted average value or the relationship between the degree of portrait and the portrait region weighted average value.

In step S16, the block integrating unit 13 supplies the open sky region weighted average value sdo and the portrait region weighted average value sdp to the integrated value analyzing unit 14. The integrated value analyzing unit 14 obtains, from the open sky region weighted average value sdo and the portrait region weighted average value sdp, the degree of open sky and the degree of portrait using a relationship such as that illustrated in FIG. 15. Furthermore, the integrated value analyzing unit 14 analyzes the degree of open sky and the degree of portrait, and supplies information on the composition of the input image to the image quality enhancement processing device 3. In FIG. 15, an average value d_ave indicating the open sky region weighted average value sdo or the portrait region weighted average value sdp is plotted in ordinate, and the degree of open sky or the degree of portrait is plotted in abscissa. That is, both of the degree of open sky and the degree of portrait take the maximum value until the average value d_ave reaches a predetermined value. When the average value d_ave becomes greater than or equal to the predetermined value, the degree of open sky and the degree of portrait become smaller as the average value d_ave becomes greater. When the average value d_ave becomes greater than or equal to a predetermined value, the degree of open sky and the degree of portrait become 0.

Figure 14:
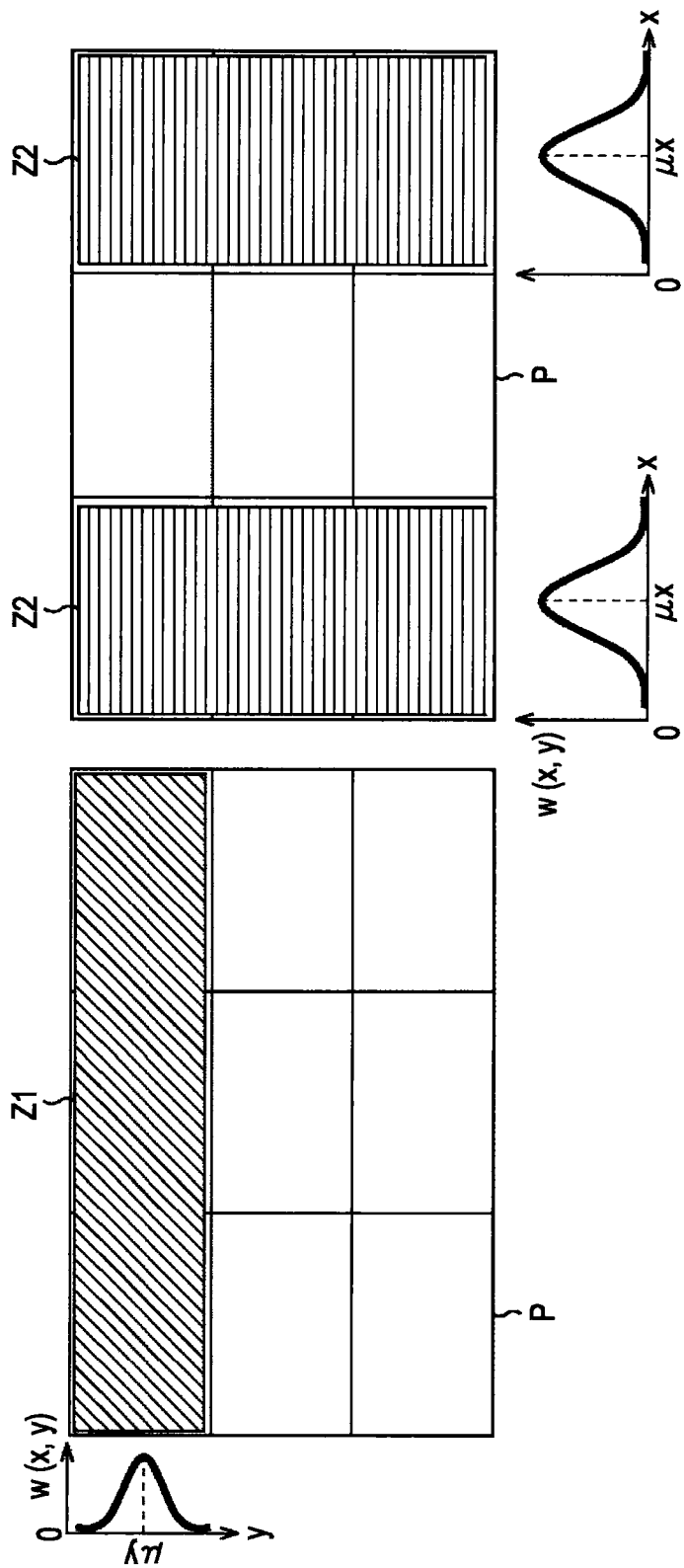
FIG. 14 includes illustrations describing an open sky region weighted average value and a portrait region weighted average value.

Here, the degree of open sky becomes greater as the open sky region weighted average value sdo, which is a weighted average of the depth values d in the region Z1 of the image, as illustrated in the left portion of FIG. 14, becomes smaller. Therefore, when the degree of open sky is great, the image has a composition with depth in an upper portion. Such a composition is highly likely to be the composition of a captured image including an object with depth, such as sky, in an upper portion of the image.

Also, the degree of portrait becomes smaller as the portrait region weighted average value sdp, which is a weighted average of the depth values d in the regions Z2 of the image, as illustrated in the right portion of FIG. 14, becomes greater. Therefore, when the degree of portrait is great, the image has a composition with depth in the left and right lateral sides. Such a composition is highly likely to be the composition of a captured image including an object with depth, such as a wall or sky, in left and right portions of the image.

Figure 16:
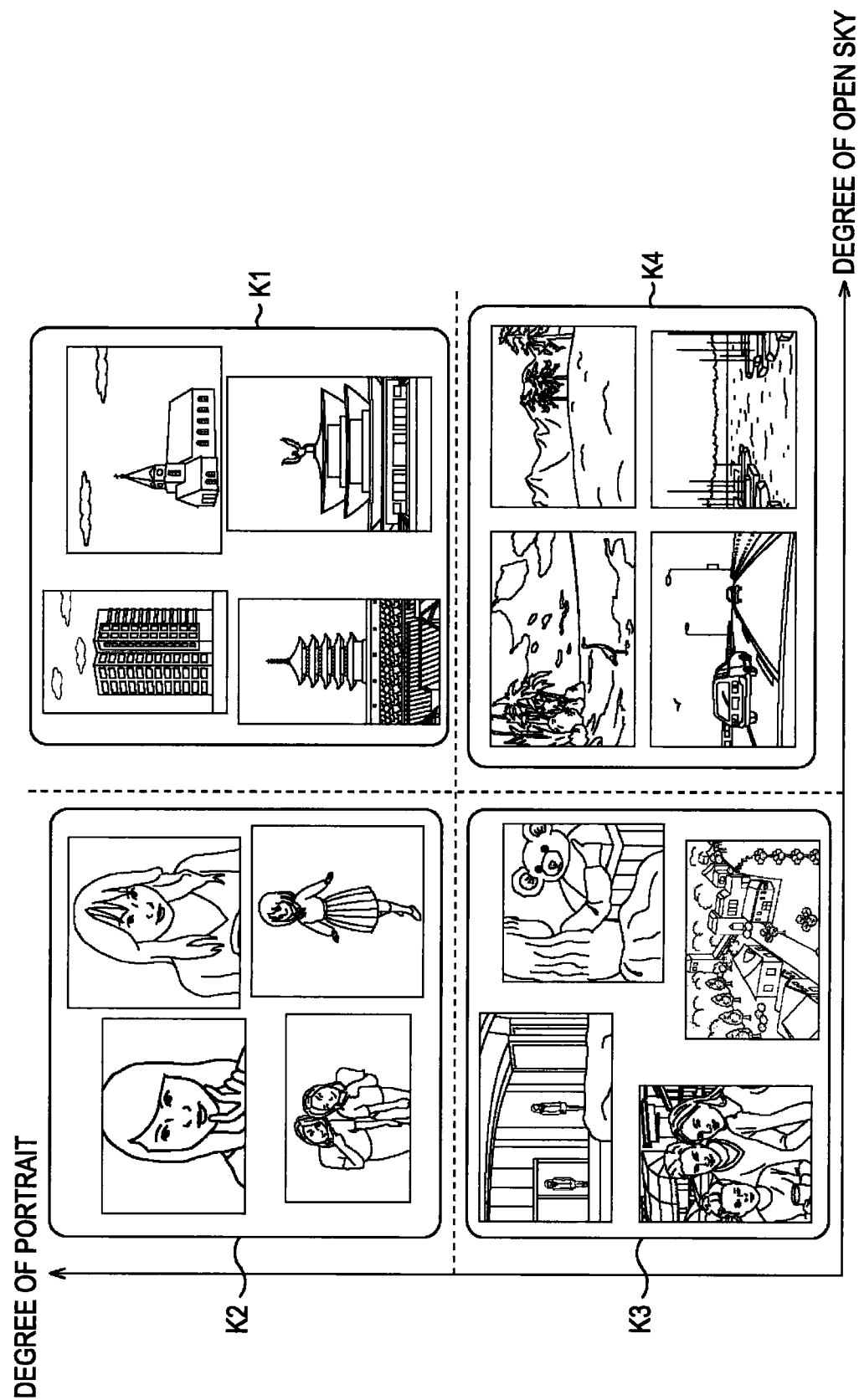
FIG. 16 is an illustration describing the relationship among the degree of open sky, the degree of portrait, and a composition.

Therefore, the integrated value analyzing unit 14 regards that the degree of open sky and the degree of portrait have tendencies as illustrated in FIG. 16, and analyzes the composition on the basis of the degree of open sky and the degree of portrait. In FIG. 16, the degree of open sky is plotted in abscissa, and the degree of portrait is plotted in ordinate.

That is, when the degree of open sky and the degree of portrait are both high, the integrated value analyzing unit 14 analyzes that the image has a composition such as that indicated as a composition K1 in FIG. 16, in which a photographic subject is in the center, and the background or sky is in the upper and lateral portions. In the composition K1, four images with a composition in which a photographic subject is in the center, and the background or sky is in the upper and lateral portions are illustrated.

When the degree of open sky is low and the degree of portrait is high, the integrated value analyzing unit 14 analyzes that the image has a composition such as that indicated as a composition K2 in FIG. 16, in which a photographic subject is in the center, and a wall or the like is in the lateral portions. In the composition K2, four images with a composition in which a photographic subject is in the center, and a wall or the like is in the lateral portions are illustrated.

Furthermore, when the degree of open sky and the degree of portrait are both low, the integrated value analyzing unit 14 analyzes that the image has a composition such as that indicated as a composition K3 in FIG. 16, in which a photographic subject occupies the entire image, and no object with depth exists in the image. In the composition K3, four images with a composition in which a photographic subject occupies the entire image, and no object with depth exists in the image are illustrated.

When the degree of open sky is high and the degree of portrait is low, the integrated value analyzing unit 14 analyzes that the image has a composition such as that indicated as a composition K4 in FIG. 16, in which, for example, sky or a field with depth extends in the entire image. In the composition K4, four images with a composition in which, for example, sky or a field with depth extends in the entire image are illustrated.

In step S17, the image quality enhancement processing device 3 performs image quality enhancement processing of the input image P on the basis of information on the composition, which is the analysis result supplied from the integrated value analyzing unit 14, and outputs an image P' which is the processing result.

When, for example, information on the composition corresponding to the above-described composition K1 is supplied, the image quality enhancement processing device 3 performs image quality enhancement by regarding that the input image is an image in which a photographic subject is in the center, and sky or the background is in the upper and lateral portions. In such a case, as illustrated in the composition K1 in FIG. 16, the input image is highly likely to be an image obtained by capturing, from a distant position, an image of a large building or the like, with sky or the like in the background. Thus, the image quality enhancement processing device 3 enhances the image quality of the input image by, for example, adjusting the white balance on the basis of the idea that the image has been captured outdoors.

When, for example, information on the composition corresponding to the above-described composition K2 is supplied, the image quality enhancement processing device 3 performs image quality enhancement by regarding that the input image is an image in which a photographic subject is in the center, and a wall or the background is in the lateral portions. In such a case, as illustrated in the composition K2 in FIG. 16, the input image is highly likely to be an image obtained by capturing an image of a photographic subject who is positioned in the center. Thus, the image quality enhancement processing device 3 enhances the image quality of the input image by detecting the position of the photographic subject by using a photographic subject recognizing function or the like, and applying, for example, color correction to the photographic subject at the detected position of the photographic subject.

When, for example, information on a composition corresponding to the above-described composition K3 is supplied, the image quality enhancement processing device 3 performs image quality enhancement by regarding that the entire region of the input image includes a photographic subject. In such a case, as illustrated in the composition K3 in FIG. 16, the input image is highly likely to be an image obtained by capturing an image in a state in which a photographic subject exists in the entire image, and the input image is highly likely to be an image that includes, as a whole, many high-frequency components. Therefore, the image quality enhancement processing device 3 enhances the image quality of the input image by, for example, increasing the sharpness and contrast of the entire image.

When, for example, information on a composition corresponding to the above-described composition K4 is supplied, the image quality enhancement processing device 3 performs image quality enhancement by regarding that the entire region of the input image includes an object with depth. In such a case, as illustrated in the composition K4 in FIG. 16, the input image is highly likely to be an image obtained by capturing an image in a state in which an object with depth exists in the entire image. Therefore, the image quality enhancement processing device 3 enhances the image quality of the input image by, for example, changing the sharpness and contrast between the foreground and the background, with the use of the depth value d, as a whole.

In the above description, as illustrated in FIG. 14, the example in which the open sky region weighted average value sdo and the portrait region weighted average value sdp are obtained as weighted averages of the depth values d in the regions indicated as the regions Z1 and Z2 has been described. However, the regions in which the open sky region weighted average value sdo and the portrait region weighted average value sdp are obtained are not limited to the regions Z1 and Z2 illustrated in FIG. 14, and may be other regions.

Figure 17:
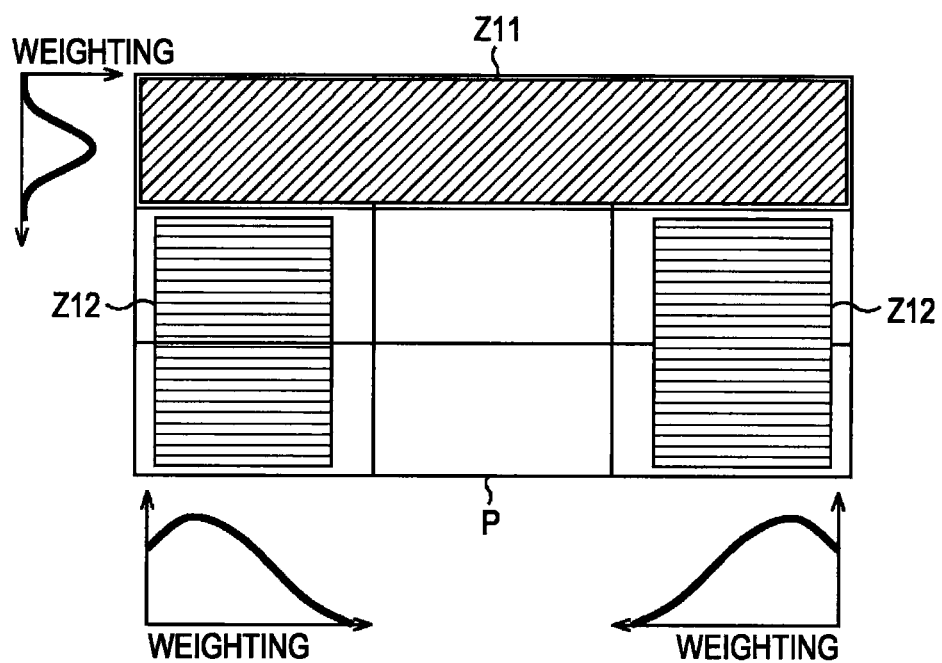
FIG. 17 is an illustration describing another open sky region weighted average value and another portrait region weighted average value.

For example, as illustrated in FIG. 17, a weighted average value of the depth values d in a region Z11 at the top of an image P may serve as the open sky region weighted average value sdo, and a weighted average value of the depth values d in regions Z12, which are lateral regions excluding the region Z11, may serve as the portrait region weighted average value sdp.

Furthermore, the distribution of the weight w(x, y) may not necessarily be that illustrated in FIG. 14, and may be that illustrated in the lower left and right portions of FIG. 17 in which, regarding the distribution of the weight w(x, y), the position at which the maximum is reached may be shifted in the lateral directions of the image P.

With the foregoing processing, depth values d of the individual pixels of an input image are accurately obtained. Accordingly, the composition of the input image can be estimated from an average value of integrated values of the depth values d, thereby realizing image processing in accordance with the composition.

2. Second Embodiment

In the foregoing description, the example in which the composition is obtained from the depth values d of the individual pixels of an input image and the image quality of the input image is enhanced has been described. Alternatively, the input image may be appropriately compressed on the basis of the obtained composition.

Structure Example of Image Processing Apparatus

Figure 18:
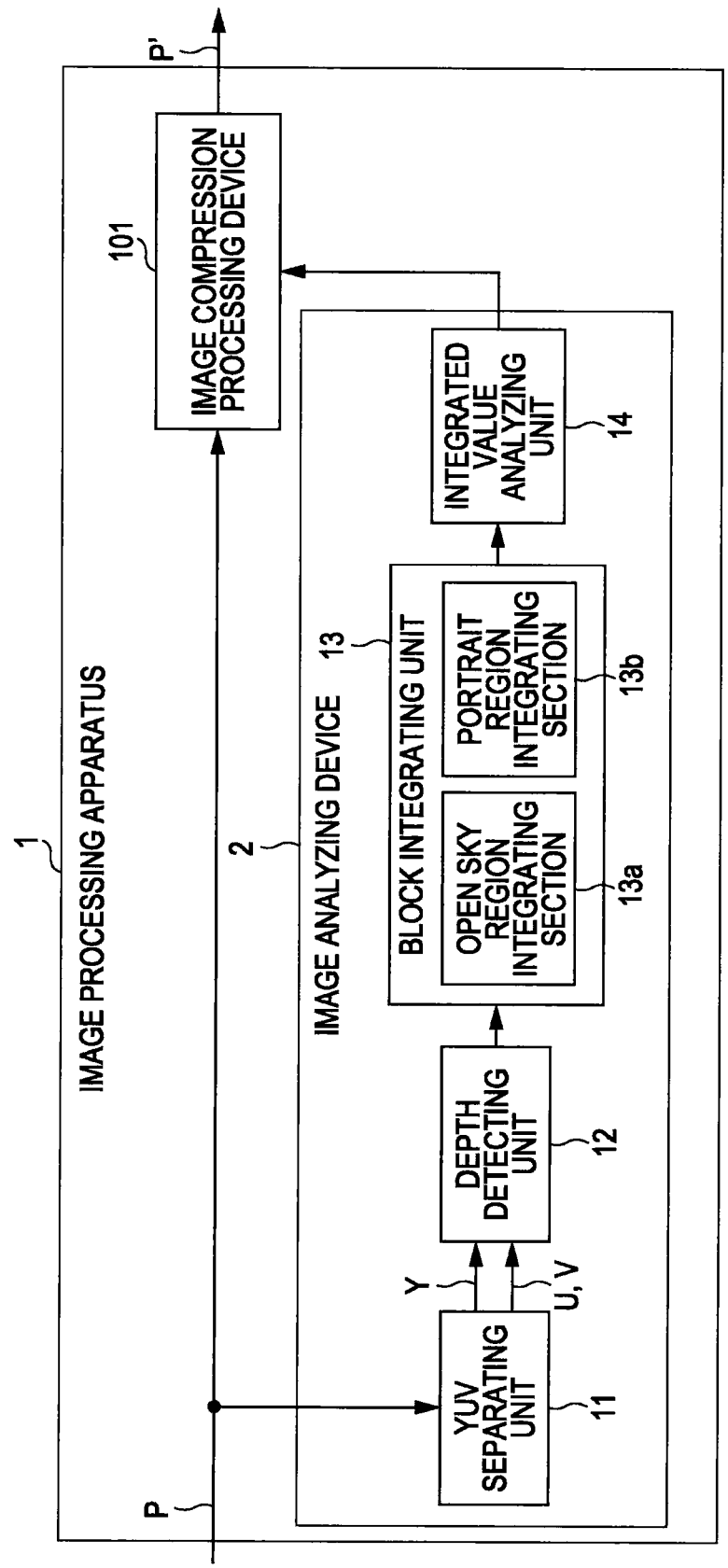
FIG. 18 is a block diagram illustrating a structure example of another image processing apparatus according to an embodiment of the present invention.

FIG. 18 illustrates a structure example of an image processing apparatus 1 that appropriately compresses an input image on the basis of the obtained composition. In FIG. 18, devices and units that have the same functions as those illustrated in FIG. 1 are given the same names and the same reference numerals, and descriptions thereof are appropriately omitted.

That is, the structure of the image processing apparatus 1 in FIG. 18 that is different from the structure of the image processing apparatus 1 in FIG. 1 is that, instead of the image quality enhancement processing device 3, an image compression processing device 101 is provided.

The image compression processing device 101 appropriately compresses an input image on the basis of information on the composition supplied from the image analyzing section 2.

Image Processing Performed by Image Processing Apparatus in FIG. 18

Referring now to the flowchart illustrated in FIG. 19, image processing performed by the image processing apparatus 1 illustrated in FIG. 18 will be described. Since the processing in steps S111 to S116 in the flowchart of FIG. 19 is the same as the processing in steps S11 to S16 described with reference to the flowchart of FIG. 6, a description thereof is omitted.

In step S117, the image compression processing device 101 compresses the input image on the basis of information on the competition supplied from the image analyzing section 2. That is, for example, when information indicating the composition K1 in FIG. 16 is supplied as information on the composition, it is highly likely that the regions corresponding to the regions Z1 and Z2 in FIG. 14 include sky. Therefore, the image compression processing device 101 improves (increases) the compression ratio of information on the regions Z1 and Z2 which are highly likely to include sky, thereby increasing the compression ratio and performing compression. With this processing, the image can be appropriately compressed without decreasing the image quality.

Alternatively, when information indicating the composition K3 is supplied as information on the competition, it is highly likely that the input image includes, as a whole, many high-frequency components. Therefore, the image compression processing device 101 performs compression without decreasing the compression ratio. With this processing, the image can be appropriately compressed by adjusting the level of the image quality to be decreased in accordance with the composition.

According to the embodiments of the present invention, the depth values of the individual pixels of an image can be accurately obtained. Using the obtained depth values, the composition of the image can be recognized, and appropriate image processing in accordance with the recognized composition can be realized.

The above-described series of processes can be executed by hardware or can be executed by software. When the series of processes is to be executed by software, a program constituting the software is installed from a recording medium into a computer embedded in dedicated hardware, or into a general personal computer, for example, which can execute various functions using various programs installed therein.

FIG. 20 illustrates a structure example of a general personal computer. The personal computer includes a central processing unit (CPU) 1001. An input/output interface 1005 is connected via a bus 1004 to the CPU 1001. A read-only memory (ROM) 1002 and a random-access memory (RAM) 1003 are connected to the bus 1004.

An input unit 1006 including a keyboard, a mouse, or the like with which the user enters an operation command, an output unit 1007 that outputs an image of a processing operation screen or a processing result to a display device, a storage unit 1008 including a hard disk drive or the like that stores programs and various items of data, and a communication unit 1009 that executes communication processing via a network represented by the Internet are connected to the input/output interface 1005. Also, a drive 1010 that reads/writes data from/to a removable medium 1011 such as a magnetic disk (including a flexible disk), an optical disk (including a compact disc-read only memory (CD-ROM) and a digital versatile disc (DVD)), a magneto-optical disk (including a mini disc (MD)), a semiconductor memory, or the like is connected to the input/output interface 1005.

The CPU 1001 executes various types of processing in accordance with a program stored in the ROM 1002, or a program read from the removable medium 1011, such as a magnetic disk, an optical disk, a magneto-optical disk, or a semiconductor memory, installed into the storage unit 1008, and loaded from the storage unit 1008 to the RAM 1003. Also, the RAM 1003 appropriately stores data necessary for the CPU 1001 to execute various types of processing.

In the specification, steps describing the program recorded on the recording medium include processes that are performed time sequentially in accordance with the order described in the specification, and may include processes that are not necessarily performed time sequentially, but are performed in parallel or individually.

The present application contains subject matter related to that disclosed in Japanese Priority Patent Application JP 2008-240334 filed in the Japan Patent Office on Sep. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising a processor, the processor comprising:

focal information extracting means for extracting, for each individual pixel of an input image, as focal information, a high-frequency component from luminance signals of peripheral pixels;

region uniting means for generating united focal information by uniting, on a pixel-by-pixel basis, the items of focal information of peripheral pixels;

depth value detecting means for detecting, using the focal information, depth values of the individual pixels of the input image;

integrating means for integrating the depth values in each predetermined region of the input image;

analyzing means for analyzing the tendency of an integrated result of the depth values in each predetermined region of the input image; and processing means for processing the input image on the basis of an analysis result obtained by the analyzing means.

2. The image processing apparatus according to claim 1, wherein the depth value detecting means includes: dark portion processing means dark portion processing means for generating dark portion focal information of the input image by replacing, on a pixel-by-pixel basis, focal information of a pixel with a value obtained on the basis of, among the items of focal information of the peripheral pixels, focal information that is greater than the focal information of the pixel, lighting component extracting means for extracting a lighting component by uniting a luminance signal of each of the pixels with the luminance signals of the peripheral pixels, brightness/darkness uniting means for computing a depth value of each of the pixels by performing a product-sum operation on the united focal information and the dark portion focal information, the product-sum operation including a coefficient using the lighting component, normalizing means for normalizing the depth value of each of the pixels, tone curve controlling means for controlling, using a tone curve, the depth value normalized by the normalizing means, saturation detecting means for detecting saturation of each of the pixels, and saturation controlling means for controlling, using the saturation, the depth value controlled using the tone curve by the tone curve controlling means.

3. The image processing apparatus according to claim 1, wherein the processing means enhances the image quality of the input image on the basis of the analysis result.

4. The image processing apparatus according to claim 1, wherein the processing means compresses the input image on the basis of the analysis result.

5. An image processing method comprising the steps, implemented by a computer, of: extracting, for each individual pixel of an input image, as focal information, a high-frequency component from luminance signals of peripheral pixels; generating, using a region uniting unit, united focal information by uniting, on a pixel-by-pixel basis, the items of focal information of peripheral pixels, detecting, using the focal information, depth values of the individual pixels of the input image; integrating the depth values in each predetermined region of the input image; analyzing the tendency of an integrated result of the depth values in each predetermined region of the input image; and processing the input image on the basis of an analysis result.

6. The image processing method according to claim 5, wherein detecting the depth values comprises:

generating dark portion focal information of the input image by replacing, on a pixel-by-pixel basis, focal information of a pixel with a value obtained on the basis of, among the items of focal information of the peripheral pixels, focal information that is greater than the focal information of the pixel, extracting a lighting component by uniting a luminance signal of each of the pixels with the luminance signals of the peripheral pixels, computing a depth value of each of the pixels by performing a product-sum operation on the united focal information and the dark portion focal information, the product-sum operation including a coefficient using the lighting component, normalizing the depth value of each of the pixels, controlling, using a tone curve, the normalized depth value, detecting saturation of each of the pixels, and controlling, using the saturation, the depth value controlled using the tone curve.

7. The image processing method according to claim 5, wherein processing comprises enhancing the image quality of the input image on the basis of the analysis result.

8. The image processing method according to claim 5, wherein processing comprises compressing the input image on the basis of the analysis result.

9. A non-transitory computer-readable medium that causes a computer to perform processing comprising the steps of:

extracting, for each individual pixel of an input image, as focal information, a high-frequency component from luminance signals of peripheral pixels;

generating united focal information by uniting, on a pixel-by-pixel basis, the items of focal information of peripheral pixels, detecting, using the focal information, depth values of the individual pixels of the input image;

integrating the depth values in each predetermined region of the input image;

analyzing the tendency of an integrated result of the depth values in each predetermined region of the input image; and processing the input image on the basis of an analysis result.

10. The non-transitory computer-readable medium according to claim 9, wherein detecting the depth values comprises:

generating dark portion focal information of the input image by replacing, on a pixel-by-pixel basis, focal information of a pixel with a value obtained on the basis of, among the items of focal information of the peripheral pixels, focal information that is greater than the focal information of the pixel, extracting a lighting component by uniting a luminance signal of each of the pixels with the luminance signals of the peripheral pixels, computing a depth value of each of the pixels by performing a product-sum operation on the united focal information and the dark portion focal information, the product-sum operation including a coefficient using the lighting component, normalizing the depth value of each of the pixels, controlling, using a tone curve, the normalized depth value, detecting saturation of each of the pixels, and controlling, using the saturation, the depth value controlled using the tone curve.

11. The non-transitory computer-readable medium according to claim 9, wherein processing comprises enhancing the image quality of the input image on the basis of the analysis result.

12. The non-transitory computer-readable medium according to claim 9, wherein processing comprises compressing the input image on the basis of the analysis result.

13. An image processing apparatus comprising a processor, the processor comprising:

a focal information extracting unit configured to extract, for each individual pixel of an input image, as focal information a high-frequency component from luminance signals of peripheral pixels;

a region uniting unit configured to generate united focal information by uniting, on a pixel-by-pixel basis, the items of focal information of peripheral pixels, a depth value detecting unit configured to detect, using the focal information, depth values of the individual pixels of the input image;

an integrating unit configured to integrate the depth values in each predetermined region of the input image;

an analyzing unit configured to analyze the tendency of an integrated result of the depth values in each predetermined region of the input image; and a processing unit configured to process the input image on the basis of an analysis result obtained by the analyzing unit.

14. The image processing apparatus according to claim 13, wherein the depth value detecting unit includes:

a dark portion processing unit configured to generate dark portion focal information of the input image by replacing, on a pixel-by-pixel basis, focal information of a pixel with a value obtained on the basis of, among the items of focal information of the peripheral pixels, focal information that is greater than the focal information of the pixel, a lighting component extracting unit configured to extract a lighting component by uniting a luminance signal of each of the pixels with the luminance signals of the peripheral pixels, a brightness/darkness uniting unit configured to compute a depth value of each of the pixels by performing a product-sum operation on the united focal information and the dark portion focal information, the product-sum operation including a coefficient using the lighting component, a normalizing unit configured to normalize the depth value of each of the pixels, a tone curve controlling unit configured to control, using a tone curve, the depth value normalized by the normalizing unit, a saturation detecting unit configured to detect saturation of each of the pixels, and a saturation controlling unit configured to control, using the saturation, the depth value controlled using the tone curve by the tone curve controlling unit.

15. The image processing apparatus according to claim 13, wherein the processing unit enhances the image quality of the input image on the basis of the analysis result.

16. The image processing apparatus according to claim 13, wherein the processing unit compresses the input image on the basis of the analysis result.

* * * * *